United States Patent
Fiebig et al.

(10) Patent No.: US 10,404,039 B2
(45) Date of Patent: Sep. 3, 2019

(54) ENERGY STORAGE UNITS AND SYSTEMS WITH SEGMENTED BRANCH INTERCONNECTS

(71) Applicant: Lockheed Martin Energy, LLC, Tyler, TX (US)

(72) Inventors: Bradley Fiebig, Mansfield, TX (US); Jason R. Tigges, Arlington, TX (US); William L. Wright, Argyle, TX (US); George C. Zimbru, Duncanville, TX (US)

(73) Assignee: Lockheed Martin Energy, LLC, Tyler, TX (US)

( * ) Notice: Subject to any disclaimer, the term of this patent is extended or adjusted under 35 U.S.C. 154(b) by 0 days.

(21) Appl. No.: 15/725,771

(22) Filed: Oct. 5, 2017

(65) Prior Publication Data

US 2018/0097341 A1 Apr. 5, 2018

Related U.S. Application Data

(60) Provisional application No. 62/404,433, filed on Oct. 5, 2016.

(51) Int. Cl.
*H01M 2/10* (2006.01)
*H02B 1/20* (2006.01)
(Continued)

(52) U.S. Cl.
CPC .......... *H02B 1/20* (2013.01); *H01M 2/1077* (2013.01); *H02B 1/26* (2013.01); *H02J 3/00* (2013.01); *H01M 2220/10* (2013.01)

(58) Field of Classification Search
None
See application file for complete search history.

(56) References Cited

U.S. PATENT DOCUMENTS 3,696,283 A * 10/1972 Ackley, III ........... H02J 7/0003
320/101
4,957,829 A * 9/1990 Holl ..................... H01M 2/1077
429/159
(Continued)

FOREIGN PATENT DOCUMENTS

WO 2015057405 A1 4/2015

OTHER PUBLICATIONS

"Hospitality Brochure MENA 2014", LRS Middle East, 2014, 20 pages (Year: 2014).*
(Continued)

*Primary Examiner* — Robert J Hoffberg
(74) *Attorney, Agent, or Firm* — Withrow & Terranova, PLLC

(57) ABSTRACT

An energy storage unit (ESU) is provided herein. The ESU includes a housing forming an interior volume configured to store a plurality of batteries that can collectively provide a maximum power level. The ESU includes a segmented branch interconnect system including a power transfer assembly that includes a first power interconnect system and a second power interconnect system. The second power interconnect system is configured to be coupled to a first adjacent power interconnect system of a first adjacent ESU. The power transfer assembly includes one or more conductors coupled to the first power interconnect system and the second power interconnect system, and is configured to transfer electrical power therebetween. The power transfer assembly is rated to transfer a power level that is at least three times the maximum power level provided by the plurality of batteries stored in the housing.

23 Claims, 8 Drawing Sheets

(51) Int. Cl.
*H02B 1/26* (2006.01)
*H02J 3/00* (2006.01)

(56) References Cited

U.S. PATENT DOCUMENTS

| | | | | |
|---|---|---|---|---|
| 5,346,786 | A * | 9/1994 | Hodgetts | H01M 2/1016 429/121 |
| 5,378,552 | A * | 1/1995 | Dixon, Jr. | B60L 3/0007 429/1 |
| 5,496,657 | A * | 3/1996 | Dixon, Jr. | H01M 2/206 429/1 |
| 5,814,968 | A * | 9/1998 | Lovegreen | H01M 2/1022 320/113 |
| 7,786,616 | B2 * | 8/2010 | Naden | H02J 3/28 307/64 |
| 8,410,634 | B2 * | 4/2013 | Park | H02J 3/32 307/65 |
| 8,575,780 | B2 * | 11/2013 | Moon | H02J 9/062 307/125 |
| 8,907,522 | B2 * | 12/2014 | Park | H02J 3/32 307/65 |
| 8,975,774 | B2 * | 3/2015 | Kreutzer | H01M 2/0245 307/10.1 |
| 9,101,112 | B2 * | 8/2015 | Giunta | G01C 15/06 |
| 9,419,475 | B2 * | 8/2016 | Edelen | H02J 9/062 |
| 10,062,977 | B2 * | 8/2018 | Fees | H01R 9/226 |
| 2002/0145404 | A1 | 10/2002 | Dasgupta et al. | |
| 2007/0080666 | A1 | 4/2007 | Ritter et al. | |
| 2011/0140527 | A1 | 6/2011 | Choi | |
| 2014/0079981 | A1 | 3/2014 | Sheen et al. | |
| 2017/0346322 | A1 * | 11/2017 | Kuran | H01M 10/482 |
| 2018/0337385 | A1 * | 11/2018 | Schnakofsky | H01M 2/206 |

OTHER PUBLICATIONS

International Search Report and Written Opinion for International Patent Application No. PCT/US2017/055318, dated Jan. 17, 2018, 15 pages.

International Preliminary Report on Patentability for International Patent Application No. PCT/US2017/055318, dated Apr. 18, 2019, 11 pages.

* cited by examiner

ENERGY STORAGE UNITS AND SYSTEMS WITH SEGMENTED BRANCH INTERCONNECTS

RELATED APPLICATION

This application claims the benefit of U.S. Provisional Application No. 62/404,433, filed on Oct. 5, 2016, entitled "ENERGY STORAGE UNITS AND SYSTEMS," the disclosure of which is hereby incorporated herein by reference in its entirety.

TECHNICAL FIELD

The embodiments relate generally to energy storage and, in particular, to an energy storage unit that can be coupled to one or more other energy storage units.

BACKGROUND

The civil, mechanical, and electrical construction costs associated with installing energy storage systems can erode the economic value of these energy storage system deployments. Traditionally, an energy storage system includes one or more battery enclosures that house a bank of batteries coupled to a common direct current (DC) bus and includes necessary controls and DC protection to ensure safety. These battery enclosures are interconnected to one or more power conversion systems in the field using high voltage DC cabling typically through underground conduits. The power conversion system(s) are then typically interconnected to necessary alternating current (AC) distribution, protection, and transformation to safely tie into an electrical grid. This field integration work includes trenching, conduit runs, cable runs, circuit combining and protection equipment on both the AC circuits and DC circuits associated with energy storage systems. Such site work is expensive, and such systems often not only involve distribution of low and medium three-phase AC voltage, but also often require distributing high DC voltages as well, which is typically less familiar to electrical contractors, further increasing costs and potentially increasing safety risks. In other words, energy storage system installation and maintenance in the field involves a high degree of field labor cost and workmanship risk, such as with respect to personal safety of workers and operational integrity of equipment.

SUMMARY

An energy storage unit (ESU) is provided herein. The ESU includes a housing to store a plurality of batteries therein. The ESU includes a segmented branch interconnect system including a power transfer assembly with a first power interconnect system and a second power interconnect system. Each of the first and second power interconnect systems is configured to be coupled to adjacent power interconnect systems of adjacent ESUs and/or to an electrical grid. The power transfer assembly includes one or more conductor coupled to the first power interconnect system and the second power interconnect system and configured to transfer electrical power therebetween. The power transfer assembly is rated to transfer a power level that is significantly larger (e.g., at least three times larger, five times larger, ten times larger, etc.) than a maximum power level provided by the plurality of batteries stored in the housing. In this way, the power transfer assembly is configured to transfer power of the plurality of batteries stored in the housing and of one or more adjacent ESUs through the power transfer assembly. Among other advantages, the embodiments facilitate a scalable energy storage system that has standardized above ground connections, greatly reducing trenching and other labor costs, and allowing the energy storage system to be easily expanded as needed. Some embodiments also eliminate or reduce a need for in-the-field coupling of relatively large DC electrical equipment, and allow the use of aluminum conductors in the ESUs without the need for specialized in-the-field expertise associated with aluminum conductors.

In one embodiment, an energy storage unit (ESU) is provided. The ESU includes a housing having a first end portion and a second end portion. The housing forms an interior volume configured to store a plurality of batteries that can collectively provide a maximum power level. The ESU also includes a segmented branch interconnect system including a power transfer assembly. The power transfer assembly includes a first power interconnect system positioned in proximity to the first end portion and includes a second power interconnect system positioned in proximity to the second end portion. The second power interconnect system is configured to be coupled to a first adjacent power interconnect system of a first adjacent ESUs. The power transfer assembly also includes one or more conductors coupled to the first power interconnect system and the second power interconnect system. The one or more conductors are configured to transfer electrical power between the first power interconnect system and the second power interconnect system. The power transfer assembly is rated to transfer a power level that is at least three times the maximum power level provided by the plurality of batteries stored in the housing.

In another embodiment, an energy storage unit (ESU) is provided. The ESU includes a plurality of ESUs. Each ESU includes a housing having a first end portion and a second end portion. The housing forms an interior volume configured to store a plurality of batteries that can collectively provide a maximum power level. Each ESU also includes a segmented branch interconnect system including a power transfer assembly. The power transfer assembly includes a first power interconnect system positioned in proximity to the first end portion and a second power interconnect system positioned in proximity to the second end portion. The power transfer assembly also includes one or more conductors coupled to the first power interconnect system and the second power interconnect system. The one or more conductors are configured to transfer electrical power between the first power interconnect system and the second power interconnect system. The power transfer assembly is rated to transfer a power level that is at least three times the maximum power level provided by the plurality of batteries stored in the housing. A first ESU of the plurality of ESUs is configured to be coupled to an electrical grid. Each power transfer assembly of each ESUs is configured to be coupled to a power transfer assembly of another ESU such that each power transfer assembly in the plurality of ESUs are coupled together.

In another embodiment, an energy storage unit (ESU) is provided. The ESU includes a housing that forms an interior volume configured to store a plurality of batteries that can collectively provide a maximum power level. The ESU also includes a segmented branch interconnect system including a power transfer assembly. The power transfer assembly includes a power interconnect system configured to be coupled to an adjacent power interconnect system of an adjacent ESU. The power transfer assembly also includes one or more conductors configured to be coupled to the plurality of batteries and the adjacent power interconnect system of the adjacent ESUs. The power transfer assembly is rated to transfer a power level that is at least three times the maximum power level provided by the plurality of batteries stored in the housing.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The use herein of ordinals in conjunction with an element is solely for distinguishing what might otherwise be similar or identical labels, such as "first end portion" and "second end portion," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

An energy storage unit (ESU) is provided herein. The ESU includes a housing to store a plurality of batteries therein. The ESU includes a segmented branch interconnect system including a power transfer assembly with a first power interconnect system and a second power interconnect system. Each of the first and second power interconnect systems is configured to be coupled to adjacent power interconnect systems of adjacent ESUs and/or to an electrical grid. The power transfer assembly includes one or more conductors coupled to the first power interconnect system and the second power interconnect system and configured to transfer electrical power therebetween. The power transfer assembly is rated to transfer a power level that is significantly larger (e.g., at least three times larger, five times larger, ten times larger, etc.) than a maximum power level provided by the plurality of batteries stored in the housing. In this way, the power transfer assembly is configured to transfer power of the plurality of batteries stored in the housing and of one or more adjacent ESUs through the power transfer assembly. Among other advantages, the embodiments facilitate a scalable energy storage system that has standardized above ground connections, greatly reducing trenching and other labor costs, and allowing the energy storage system to be easily expanded as needed. Some embodiments also eliminate or reduce a need for in-the-field coupling of relatively large DC electrical equipment, and allow the use of aluminum conductors in the ESUs without the need for specialized in-the-field expertise associated with aluminum conductors.

Figure 1:
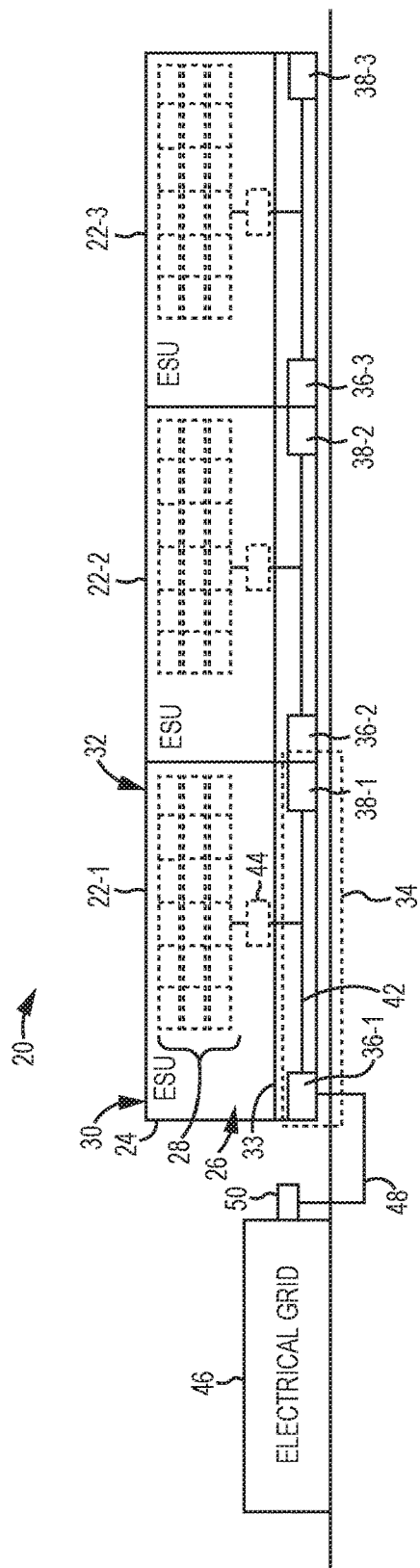
FIG. 1 is a diagram of an energy storage system according to one embodiment.

The embodiments relate to energy storage units with oversized branch segments that can be interconnected above ground easily, greatly reducing cost and expense of traditional site work associated with connecting energy storage systems to an electrical grid. FIG. 1 is a diagram of an energy storage system (ESS) 20 according to one embodiment. The ESS 20 includes a plurality of energy storage units (ESUs) 22-1-22-3 (generally, ESUs 22). The ESU 22-1 is configured to include a pre-wired branch segment of a branch circuit and is configured to be coupled to an adjacent power interconnect system 36-2 of the first adjacent ESU 22-2 above ground forming a chain of ESUs 22. Similarly, the first adjacent ESU 22-2 is configured to be coupled to the ESU 22-3 above ground. One of the ESUs 22 in the chain of ESUs (e.g., at the ends of the chain or in the middle of the chain) is then connected to electrical grid 46 via underground cabling 48, as explained below in more detail. Such above-ground connections eliminate or greatly reduce costs and risks associated with underground cabling, among other advantages. Although ESU 22-1 will be discussed in detail below, it is noted that the ESUs 22-2 and 22-3 may be similarly configured with regard to the ESU 22-1. Further, it is noted that electrical power is discussed in detail below, but that the principles disclosed (e.g., including a large branch segment within an enclosure) may be applied to other industries requiring resources shared among multiple pieces of equipment, such as in communication protocols (e.g., over a network), fluids, etc.

The ESU 22-1 includes a housing 24 that forms an interior volume 26. The interior volume 26 is configured to store a plurality of batteries 28 that can collectively provide a maximum power level. At an electrical and mechanical level, the batteries 28 include a plurality of battery cells which form a battery string (stored in a battery module), and a plurality of battery strings form a battery bank (stored in a battery rack). Accordingly, the batteries 28 may include a plurality of battery cells, a plurality of battery strings, and/or a plurality of battery banks.

The housing 24 has a first end portion 30 and a second end portion 32. The ESU 22-1 includes a segmented branch interconnect system 33 (also referred to as a branch segment) that includes a power transfer assembly 34 comprising a first power interconnect system 36-1 (also referred to as a first interconnect, first branch segment interconnect, first branch segment end assembly, first node, etc.) positioned in proximity to the first end portion 30 and also includes a second power interconnect system 38-1 (also referred to as a second interconnect, second branch segment interconnect, second branch segment end assembly, second node, etc.) positioned in proximity to the second end portion 32. The second power interconnect system 38-1 is configured to be coupled to a first adjacent power interconnect system 36-2 of a first adjacent ESUs 22-2 (e.g., by a jumper). In the illustrated embodiment, the first power interconnect system 36-1 and the second power interconnect system 38-1 are positioned in the interior volume 26. However, in other embodiments, the first power interconnect system 36-1 and the second power interconnect system 38-1 may be coupled to the exterior of the housing 24. In certain embodiments, the first power interconnect system 36-1 and/or the second power interconnect system 38-1 may be configured to connect to adjacent ESUs 22 and/or the underground cabling 48 for connection to the electrical grid 46.

The power transfer assembly 34 also includes one or more conductors 42 (also referred to as a branch segment, branch segment conductor, busbar, etc.) coupled to the first power interconnect system 36-1 and the second power interconnect system 38-1, the one or more conductors 42 being configured to transfer electrical power between the first power interconnect system 36-1 and the second power interconnect system 38-1. In some embodiments, the one or more conductors 42 comprises copper. In other embodiments, the one or more conductors 42 comprise aluminum. Aluminum is relatively inexpensive compared to copper, but requires certain fittings and expertise that are specific to aluminum and not needed for copper. Consequently, ESSs often do not use aluminum because the requisite expertise for wiring aluminum may not be readily available in the field. However, in the present disclosure, the power transfer assembly 34 may be manufactured as part of the ESU 22-1, such that the power transfer assembly 34 is assembled and wired together in a factory environment where appropriate expertise is available. Manufacturing costs and workmanship risks are significantly less than field labor costs and workmanship risks, and thus, the cost of using an aluminum conductor in the power transfer assembly 34 of ESU 22-1 is significantly less than that of a copper conductor, and the corresponding cost of the ESU 22-1 as a whole is also significantly less than other ESSs that use copper.

The power transfer assembly 34 is oversized and is rated to transfer a power level that is at least three times the maximum power level (e.g., at least 5 times, at least 10 times, at least 20 times, at least 50 times, at least 100 times, at least 1,000 times, etc.), so that the power transfer assembly 34 can handle the power of itself and throughput power of other ESUs 22-2, 22-3. In other words, the power transfer assembly 34 for ESU 22-1 is purposefully oversized for the batteries 28 stored within the ESU 22-1 and the maximum power level those batteries 28 can provide. In this way, the power transfer assembly 34 of ESU 22-1 (a single ESU 22) is configured to transfer a power level for multiple ESUs 22. In particular, each ESU 22 (e.g., ESU 22-1, ESU 22-2, and ESU 22-3) is configured to transfer a power level for multiple ESUs 22 such that the ESUs 22 are interchangeable with each other (i.e., no one ESU must be upstream or downstream from any other ESU 22), as explained below in more detail. For example, in one embodiment, each ESU 22 can support up to 2000 A of current at 480 VAC even though each individual ESU 22 can only generate between 120 A and 450 A. This allows up to fifteen ESUs 22 to be interconnected on a single branch circuit. Any one of the interconnected ESUs 22 can receive 2000 A 480 VAC service from a 480 VAC tap off a transformer or existing 480 VAC feed. However, it is noted that the power transfer assembly 34 can be configured for various electrical configurations and for any number of ESUs 22.

In one embodiment, the ESU 22-1 includes an alternating current-direct current (AC/DC) inverter 44 that is configured to be coupled between the plurality of batteries 28 and the power transfer assembly 34 (within the housing 24). The inverter 44 is configured to convert DC provided by the plurality of batteries 28 to AC for transfer of the AC by the power transfer assembly 34, and to convert alternating current provided by the power transfer assembly 34 to DC for storage in the plurality of batteries 28. In this way, in certain embodiments, each segmented branch interconnect system 33 of each ESU 22 is configured for transferring AC current through the housing 24 and above ground. By way of background, when storage enclosures are separately connected to the electrical grid 46 via a central inverter, the central inverter is relatively large and involves high voltages. Comparatively, in the present disclosure, the inverter 44 within the housing 24 of the ESU 22-1 is comparatively small and is wired in the factory not in the field. With ESU 22-1 of the present disclosure, in the field wiring takes place on the AC side, where the ESUs 22 are wired to each other and the electrical grid 46. These features eliminate costs and risks associated with DC wiring, particularly workmanship risks associated with wiring high voltage arrays together and coupling them to large AC/DC inverters.

The ESS 20 includes an electrical grid 46, such as a municipal electrical grid. The ESU 22-1 may be coupled to the electrical grid 46 via an underground cabling 48 (also referred to as a stub-up). However, as shown, ESU 22-1 is the only ESU in the chain that is coupled to the electrical grid 46 via the underground cabling 48. Thus, in this example, only one underground cable is used, instead of using separate underground cables to each of the ESUs 22-1-22-3. Each of the ESUs 22-1-22-3 are connected to each other above ground. It is noted that any of the power interconnect systems of any of ESUs 22-1-22-3 may be connected to the electrical grid 46 via underground cabling 48, because ESUs 22-1-22-3 are electrically coupled to each other and the underground cabling 48 in parallel. In other words, the segmented branch interconnect systems 33 of ESUs 22-1-22-3 form a single electrical node when the ESUs 22-1-22-3 are connected to each other, such that any of the conductors 42 of any of the ESUs 22-1-22-3 may be coupled to the underground cabling 48 at any point along the length of the conductors 42. In this way, fewer trenches are required for installing underground cabling to each ESU 22 and installation labor and expertise is also reduced. For example, separate underground cables require digging trenches, adding more copper to a conduit, and other material and labor costs.

Moreover, all three ESUs 22-1-22-3 connect to the electrical grid 46 by a single AC protection and transformation equipment 50, thereby eliminating the costs of a separate DC or AC protection and transformation equipment for each ESU 22 (e.g., relatively large and costly circuit breakers, etc.). Separately wiring storage enclosures (and associated batteries) to a single DC bus and single central inverter causes large DC voltages and large DC fault currents, which have safety risks and require expensive default protection devices. For example, if separately wired to the electrical grid 46, then each storage enclosure would require a first circuit breaker at the ESU and a second circuit breaker at the electrical grid 46 to protect the underground cabling therebetween. Additionally, each second circuit breaker requires a third circuit breaker for protection as a result of the AC/DC conversion. The costs of the services and equipment associated with connecting the storage enclosures to the electrical grid 46 are becoming an increasingly large percentage of the overall costs of energy storage because the cost of batteries generally reduces over time. Comparatively, in the present disclosure, each ESU 22 includes a smaller inverter 44, and each ESU 22 may be AC coupled to each other ESU 22, such that only a single AC protection and transformation equipment 50 (e.g., circuit breaker) is required at the electrical grid 46. In this way, field labor costs, human errors (e.g., faulty installation), safety risks, and costs are significantly reduced.

The segmented branch interconnect system 33 may also include additional transfer assemblies, including, by way of non-limiting example, an auxiliary power transfer assembly for communicating auxiliary power to the ESUs 22, a data communications transfer assembly for facilitating data communications among the ESUs 22, a fire suppression transfer assembly for facilitating the communication of fire suppression fluids among the ESUs 22, and a thermal system transfer assembly for facilitating the communication of refrigerants or other heat-exchange fluids among the ESUs 22. Each of the transfer assemblies may be coupled to adjacent transfer assemblies above ground. Each transfer assembly is sized in a manner sufficient to accommodate multiple ESUs 22. For example, the fire suppression transfer assembly is sized to carry sufficient fire suppression fluids for each ESU 22 in a chain of ESUs 22 that are coupled together. Similarly, the data communications transfer assembly is sized in a manner sufficient to carry data communications for each ESU 22 in a chain of ESUs 22 that are coupled together.

Each ESU 22 could be coupled to another ESU 22 and/or underground cabling 48 with any of a variety of segmented branch interconnect systems 33 (and/or conductors 42), such as a single phase AC bus, 4-wire AC bus, DC bus, etc. Accordingly, the inverter 44 could be any of a variety of power converters, such as a single phase inverter, DC/DC converter, etc. Each ESU 22 could have multiple inverters 44 (and/or converters) or auxiliary loads feeding into the segmented branch interconnect system 33 (and/or conductors 42).

Figure 2:
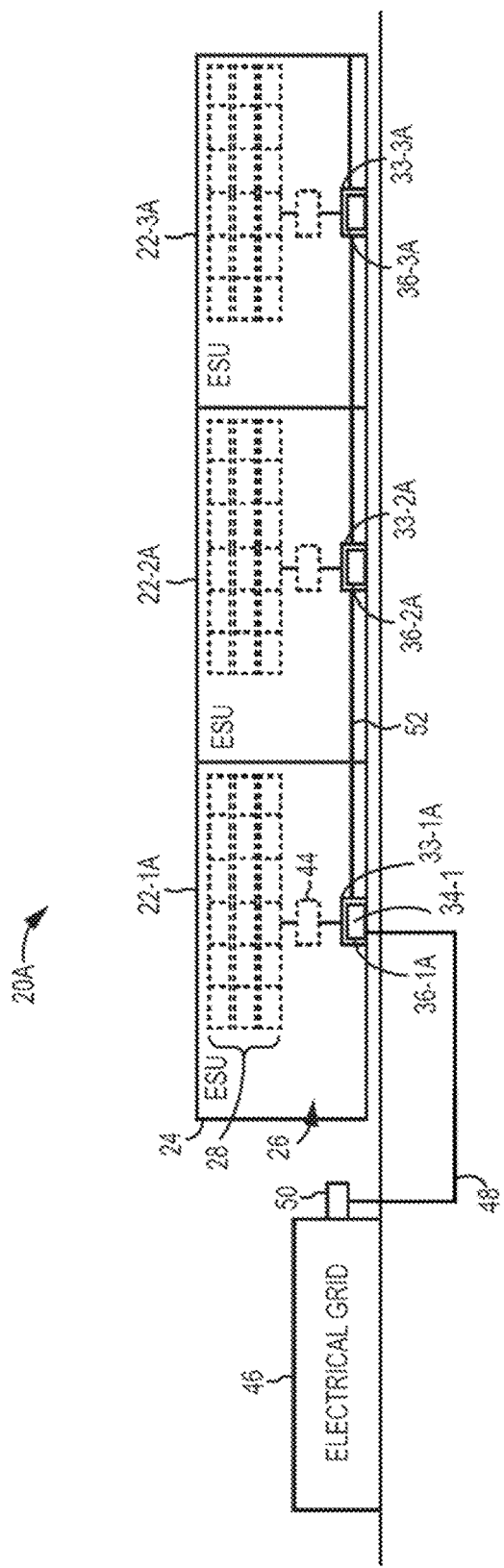
FIG. 2 is a diagram of an energy storage system according to another embodiment.

FIG. 2 is a diagram of an ESS 20-1 according to another embodiment. The ESS 20-1 is substantially similar to the ESS 20 discussed above with regard to FIG. 1 except as otherwise discussed herein. In this embodiment, three ESUs 22-1A, 22-2A, and 22-3A (generally ESUs 22A) are chained together and coupled to the electrical grid 46. However, in this embodiment, the ESU 22-1A has a segmented branch interconnect system 33-1A that includes a power transfer assembly 34-1 comprising a single first power interconnect system 36-1A. The first power interconnect system 36-1A comprises one or more conductors (not illustrated), such as a bus bar, to which the batteries 28 can couple, and which is rated to transfer a power level that is at least three times the maximum power level of the ESU 22-1A. A jumper 52 electrically couples the first power interconnect system 36-1A with a second power interconnect system 36-2A of the ESU 22-2A (and with a third power interconnect system 36-3A of the ESU 22-3A). The jumper 52 is also rated to transfer a power level that is at least three times the maximum power level of the ESU 22-1A. In other words, the jumper is oversized and is rated to transfer a power level that is at least three times the maximum power level (e.g., at least 5 times, at least 10 times, at least 20 times, at least 50 times, at least 100 times, at least 1,000 times, etc.), so that the power transfer assembly 34-1 can handle the power of itself and throughput power of other ESUs 22-2A, 22-3A. In this way, the jumper 52 of FIG. 2 is configured similarly to the conductors 42 of FIG. 1.

As discussed above, the segmented branch interconnect system 33-1A-33-3A (referred to generally as segmented branch interconnect system 33A) may also include additional transfer assemblies, including, by way of non-limiting example, an auxiliary power transfer assembly for communicating auxiliary power to the ESUs 22-1A, 22-2A, and 22-3A, a data communications transfer assembly for facilitating data communications among the ESUs 22-1A, 22-2A, and 22-3A, a fire suppression transfer assembly for facilitating the communication of fire suppression fluids among the ESUs 22-1A, 22-2A, and 22-3A, and a thermal system transfer assembly for facilitating the communication of refrigerants or other heat-exchange fluids among the ESUs 22-1A, 22-2A, and 22-3A. Each of the transfer assemblies may be coupled to adjacent transfer assemblies above ground. Each transfer assembly is sized in a manner sufficient to accommodate multiple ESUs 22-1A, 22-2A, and 22-3A. For example, the fire suppression transfer assembly is sized in a manner to carry sufficient fire suppression fluids for each ESU 22 in a chain of ESUs 22 coupled together. Similarly, the data communications transfer assembly is sized in a manner sufficient to carry data communications for each ESU 22 in a chain of ESUs 22 coupled together.

While solely for purposes of illustration, the ESSs 20 have each been illustrated as comprising three ESUs 22, the embodiments are not limited to any particular number of ESUs 22, and have applicability to any number of ESUs 22, such as 10, 15, or more ESUs 22. In such embodiments, each segmented branch interconnect system 33, 33A is sized sufficiently to communicate respective electricity, fluids, and the like for the total number of ESUs 22 that are chained together. Each segmented branch interconnect system 33, 33A may be sized larger than the total number of ESUs 22 that are chained together to allow for future expansion of the ESSs 20, 20A. For example each ESU 22 (and associated segmented branch interconnect system 33, power transfer assembly 34, conductor 42, jumper 52, etc.) may be rated to transfer a power level that is a multiplication greater than the maximum power level of the batteries 28, such as at least 5 times greater, at least 10 times greater, at least 20 times greater, at least 50 times greater, at least 100 times greater, at least 1,000 times greater, etc.

Figure 3A:
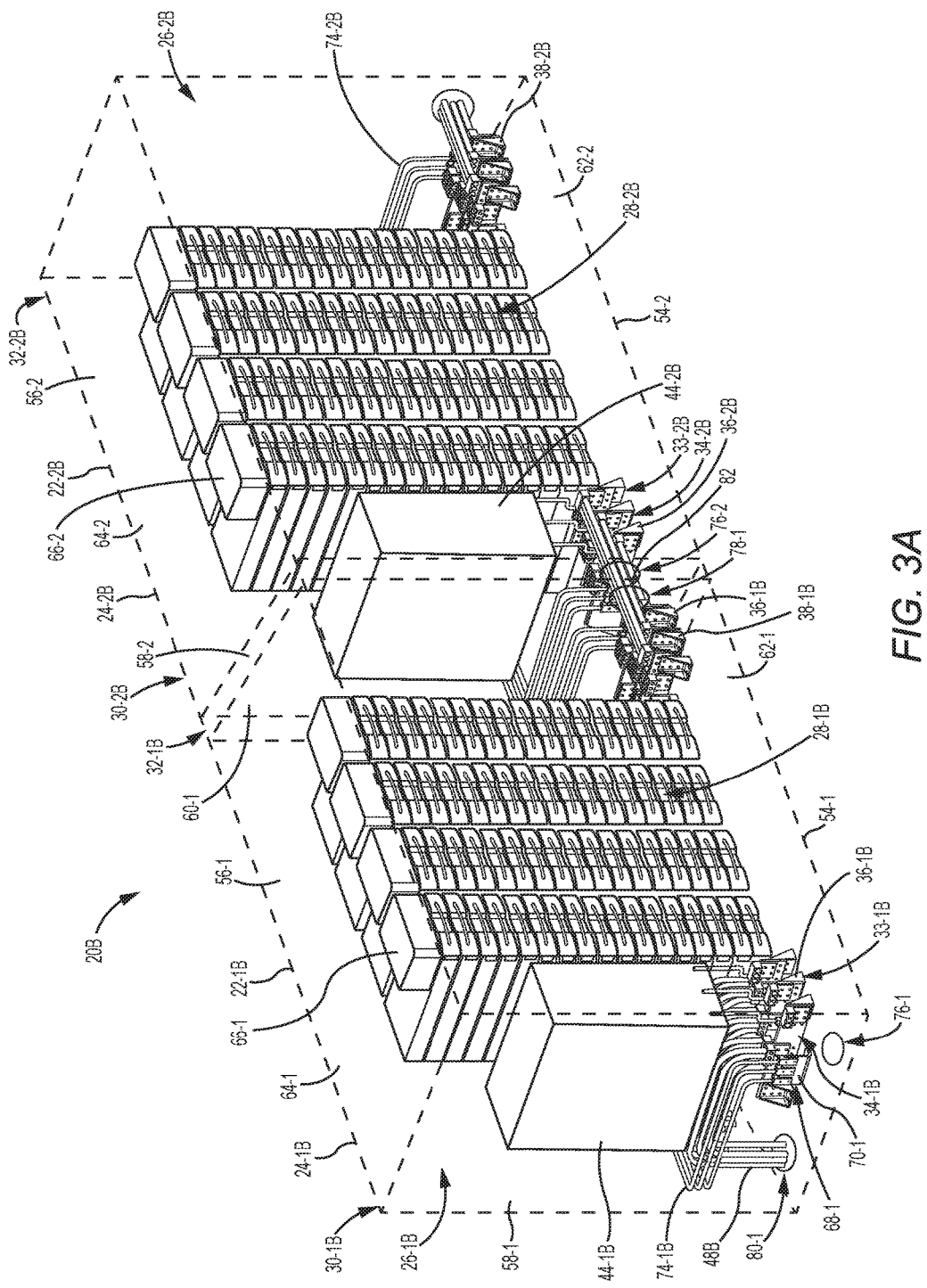
FIG. 3A is a perspective view of one embodiment of the energy storage system of FIG. 1.
Figure 3B:
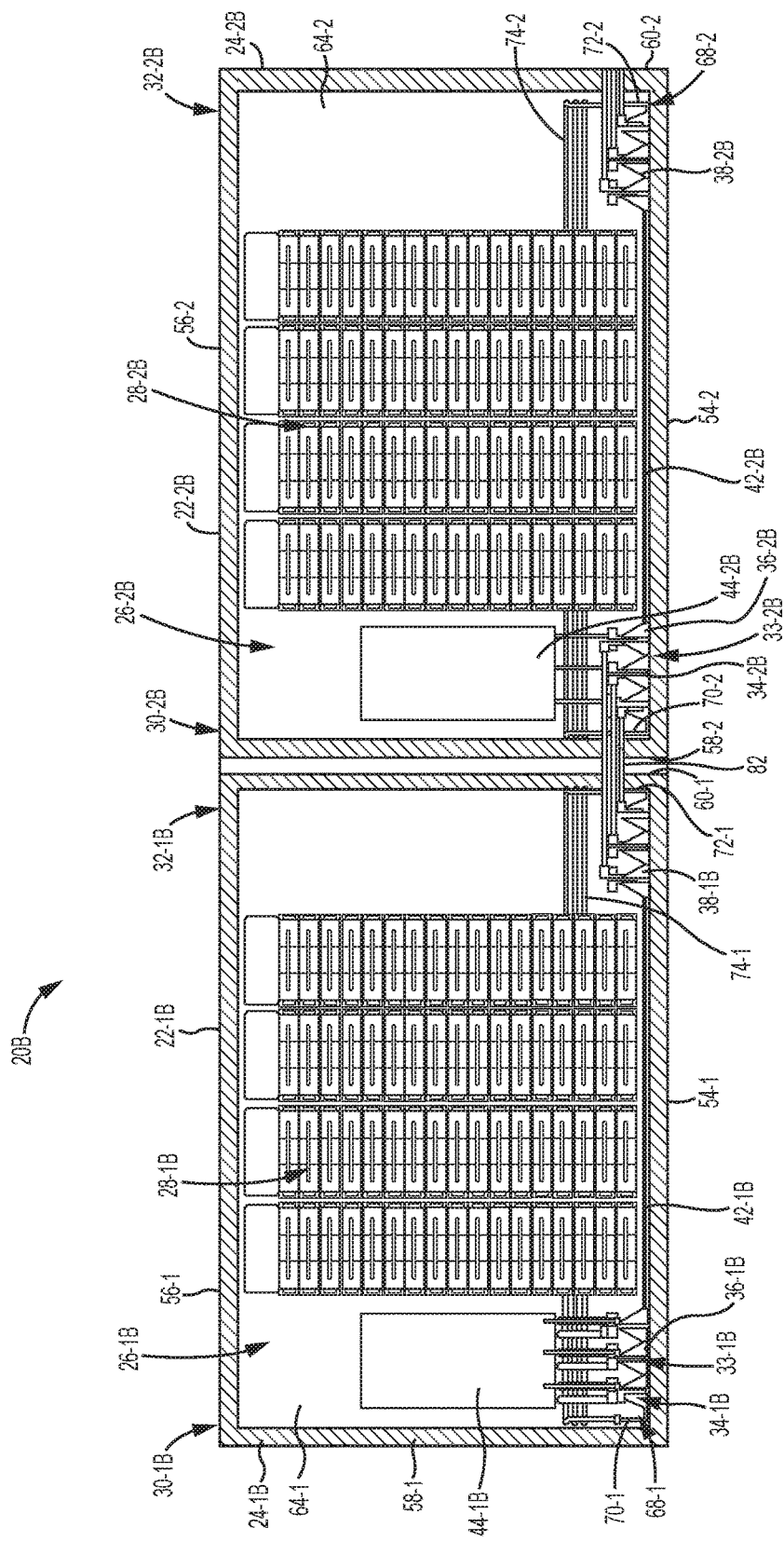
FIG. 3B is a front view of the energy storage system of FIG. 4A.
Figure 3C:
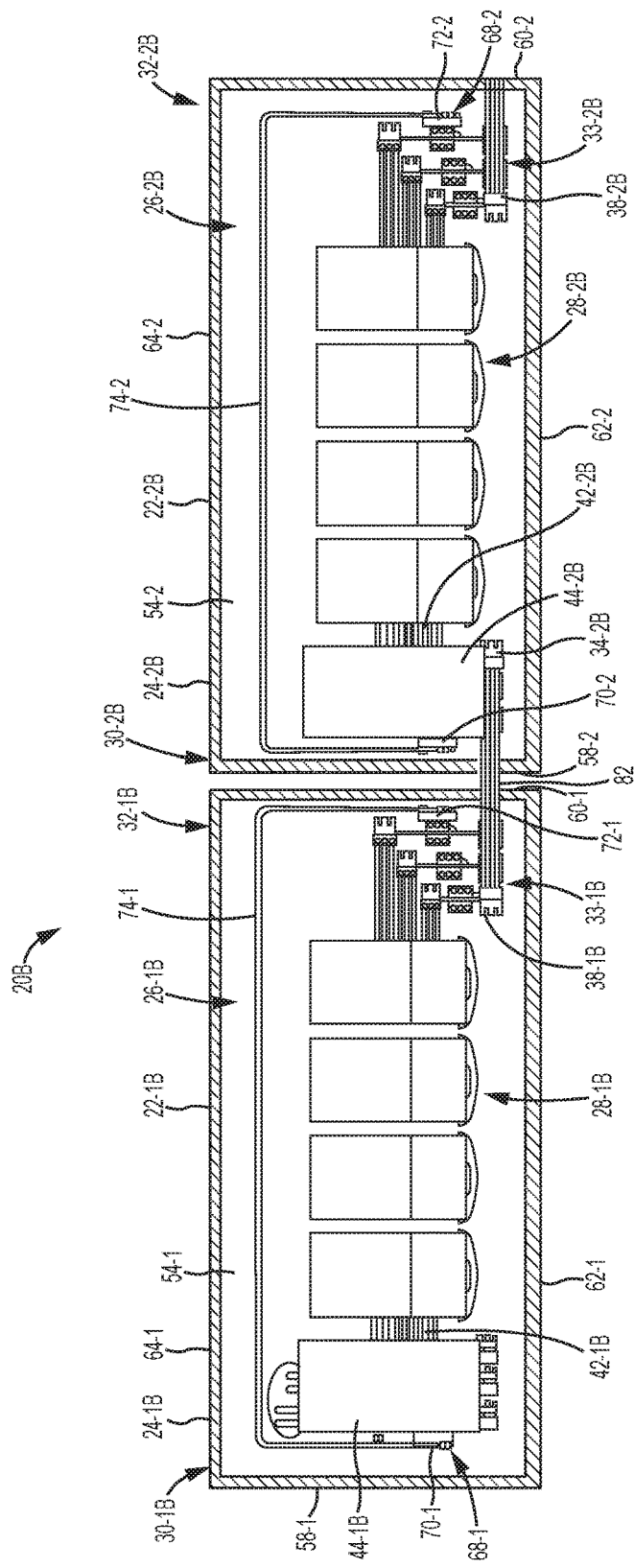
FIG. 3C is a top view of the energy storage system of FIG. 4A.

FIGS. 3A-3C are views of one embodiment of the ESS of FIG. 1. The ESS 20B is substantially similar to the ESS 20 discussed above with regard to FIG. 1 except as otherwise discussed herein. In this embodiment, the ESS 20B includes two ESUs 22-1B and 22-2B (generally referred to as ESU 22B) chained together and including cabling to couple to the electrical grid 46 (shown in FIG. 1). Of course, more ESUs 22B could be chained together.

ESU 22-1B includes a housing 24-1B with a first end portion 30-1B and a second end portion 32-1B. The housing 24-1B (and walls thereof) are shown as transparent for illustrative purposes. In particular, housing 24-1B includes a bottom wall 54-1, a top wall 56-1 (opposite the bottom wall 54-1), a left wall 58-1, a right wall 60-1 (opposite the left wall 58-1), a front wall 62-1, and a back wall 64-1 (opposite the front wall 62-1). The first end portion 30-1B is proximate the left wall 58-1 and the second end portion 32-1B is proximate the right wall 60-1. The walls of the housing 24B define an interior volume 26B and the front wall 62 could include one or more doors (not shown) providing access to the interior volume 26-1B.

ESU 22-1B includes batteries 28-1B, an inverter 44-1B, and/or other components (e.g., battery computer modules 66-1) within the interior volume 26-1B of the housing 24-1B. The batteries 28-1B are electrically coupled to the inverter 44-1B. Further, the first ESU 22-1B includes a first segmented branch interconnect system 33-1B (referred to generally as segmented branch interconnect system 33B). The first segmented branch interconnect system 33-1B includes a first power transfer assembly 34-1B which includes a first power interconnect system 36-1B and a second power interconnect system 38-1B. The first power interconnect system 36-1B and second power interconnect system 38-1B are connected to each other by conductor 42-1B, which is routed underneath the batteries 28-1B (i.e., between the batteries 28-1B and the bottom wall 54-1). However, it is noted that the conductor 42-1B may be routed anywhere within the interior volume 26-1B. It is noted that by having the conductor 42 (and/or jumper 82) above ground and within the housing 24, the conductor 42 can be cooled by the air (e.g., conductor 42 can be cooled by an air conditioning unit). This allows the conductor 42 to push more current through less costly material.

The inverter 44-1B is connected to the first power interconnect system 36-1B, although in other embodiments the inverter 44-1B is connected to the second power interconnect system 38-1B. The segmented branch interconnect system 33-1B further includes an auxiliary power transfer assembly 68-1, which includes a first auxiliary power interconnect system 70-1 at the first end portion 30-1B (proximate the first power interconnect system 36-1B) and a second auxiliary power interconnect system 72-1 at the second end portion 32-1B (proximate the second power interconnect system 38-1B). Further, an auxiliary conductor 74-1 extends from the first auxiliary power interconnect system 70-1 to the second auxiliary power interconnect system 72-1 behind the batteries 28-1B (i.e., between the batteries 28-1B and the back wall 64-1). ESU 22B-1 includes a first interconnect port 76-1 defined in the left wall 58-1, a second interconnect port 78-1 defined in the right wall 60-1, and a third interconnect port 80-1 defined in the bottom wall 54-1, explained in more detail below.

Similarly, ESU 22-2B includes a housing 24-2B with a first end portion 30-2B and a second end portion 32-2B. The housing 24-2B (and walls thereof) are shown as transparent for illustrative purposes. In particular, housing 24-2B includes a bottom wall 54-2, a top wall 56-2 (opposite the bottom wall 54-2), a left wall 58-2, a right wall 60-2 (opposite the left wall 58-2), a front wall 62-2, and a back wall 64-2 (opposite the front wall 62-2). The first end portion 30-2B is proximate the left wall 58-2 and the second end portion 32-2B is proximate the right wall 60-2. The walls of the housing 24-2B define an interior volume 26-2B and the front wall 62-2 could include one or more doors (not shown) providing access to the interior volume 26-2B.

ESU 22-2B includes batteries 28-2B, an inverter 44-2B, and/or other components (e.g., battery computer modules 66-2) within the interior volume 26-26 of the housing 24-2B. The batteries 28-2B are electrically coupled to the inverter 44-2B. Further, the ESU 22-2B includes a first segmented branch interconnect system 33-2B (referred to generally as segmented branch interconnect system 33-2B). The first segmented branch interconnect system 33-2B includes a first power transfer assembly 34-2B which includes a first power interconnect system 36-2B and a second power interconnect system 38-2B. The first power interconnect system 36-2B and second power interconnect system 38-2B are connected to each other by conductor 42-2B, which is routed underneath the batteries 28-2B (i.e., between the batteries 28-2B and the bottom wall 54-2). However, it is noted that the conductor 42-2B may be routed anywhere within the interior volume 26-2B. It is noted that by having the conductor 42-2B (and/or jumper 82) above ground and within the housing 24, the conductor 42 can be cooled by the air (e.g., conductor 42 can be cooled by an air conditioning unit). This allows the conductor 42 to push more current through less costly material.

The inverter 44-2B is connected to the first power interconnect system 36-2B, although in other embodiments the inverter 44-2B is connected to the second power interconnect system 38-2B. The segmented branch interconnect system 33-2B further includes an auxiliary power transfer assembly 68-2, which includes a first auxiliary power interconnect system 70-2 at the first end portion 30-2B (proximate the first power interconnect system 36-2B) and a second auxiliary power interconnect system 72-2 at the second end portion 32-2B (proximate the second power interconnect system 38-2B). Further, an auxiliary conductor 74-2 extends from the first auxiliary power interconnect system 70-2 to the second auxiliary power interconnect system 72-2 behind the batteries 28-2B (i.e., between the batteries 28-2B and the back wall 64-2). ESU 22B-2 includes a first interconnect port 76-2 defined in the left wall 58-2, a second interconnect port 78-2 defined in the right wall 60-2, and a third interconnect port 80-2 (not shown) defined in the bottom wall 54-2, explained in more detail below.

As illustrated, the first power interconnect system 36-1B of the first ESU 22-2B is electrically coupled to underground cabling 48B (e.g., stub-up) through the third interconnect port 80-1. The second power interconnect system 38-1B of the first ESU 22-2B is electrically coupled to the first power interconnect system 36-2B of the second ESU 22-2B by a jumper 82 extending from the second power interconnect system 36-1B of the first ESU 22-2B through the second interconnect port 78-1 of the first ESU 22-1B and the first interconnect port 76-2 of the second ESU 22-2B to the first power interconnect system 36-2B of the second ESU 22-2B. The first and second interconnect ports 76-1, 76-2 are raised relative to the bottom wall 54-1 to keep the jumpers 82 off the ground and prevent water flooding, etc.

In this way, each ESU 22B is configured to be coupled to adjacent ESUs 22B and/or to an electrical grid. Each ESU 22B is configured to transfer a power level that is significantly larger (e.g., at least three times larger, five times larger, ten times larger, etc.) than a maximum power level provided by the plurality of batteries 28 stored therein. The ESUs 22B are configured to facilitate a scalable ESS that has standardized above ground connections.

Figure 4:
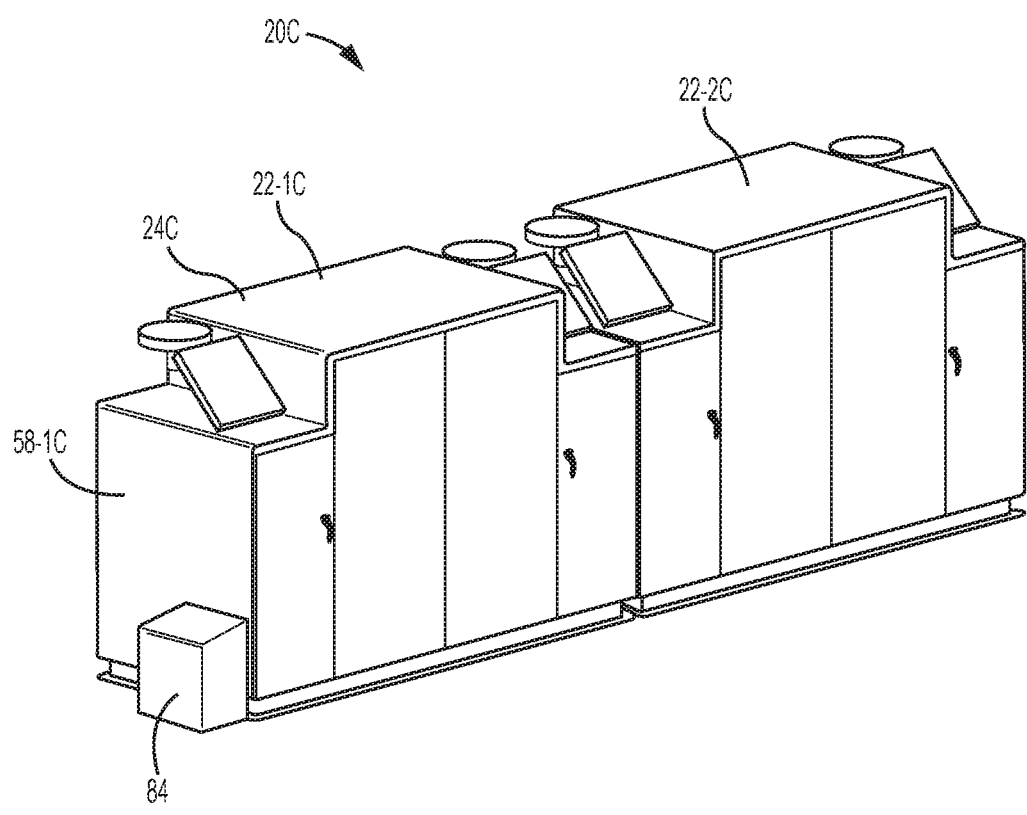
FIG. 4 is a perspective view of the energy storage system of FIGS. 1 and 3A-3C with an endcap for routing an underground cable into the energy storage system.
Figure 5A:
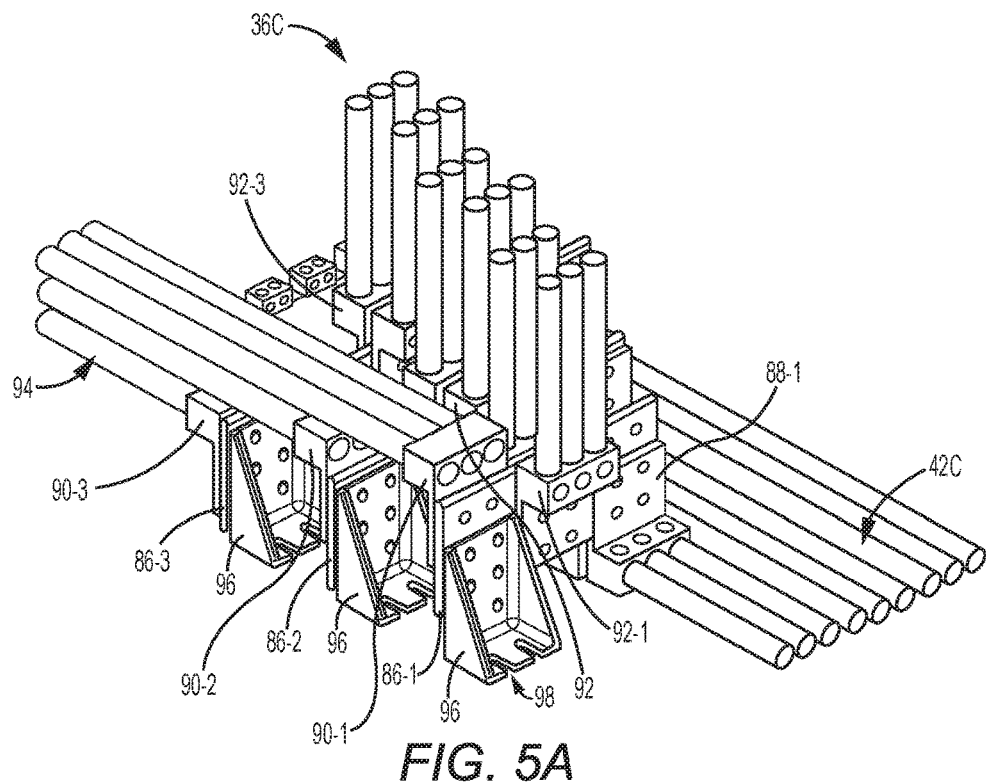
FIG. 5A is a front perspective view of a segmented branch interconnect system.
Figure 5B:
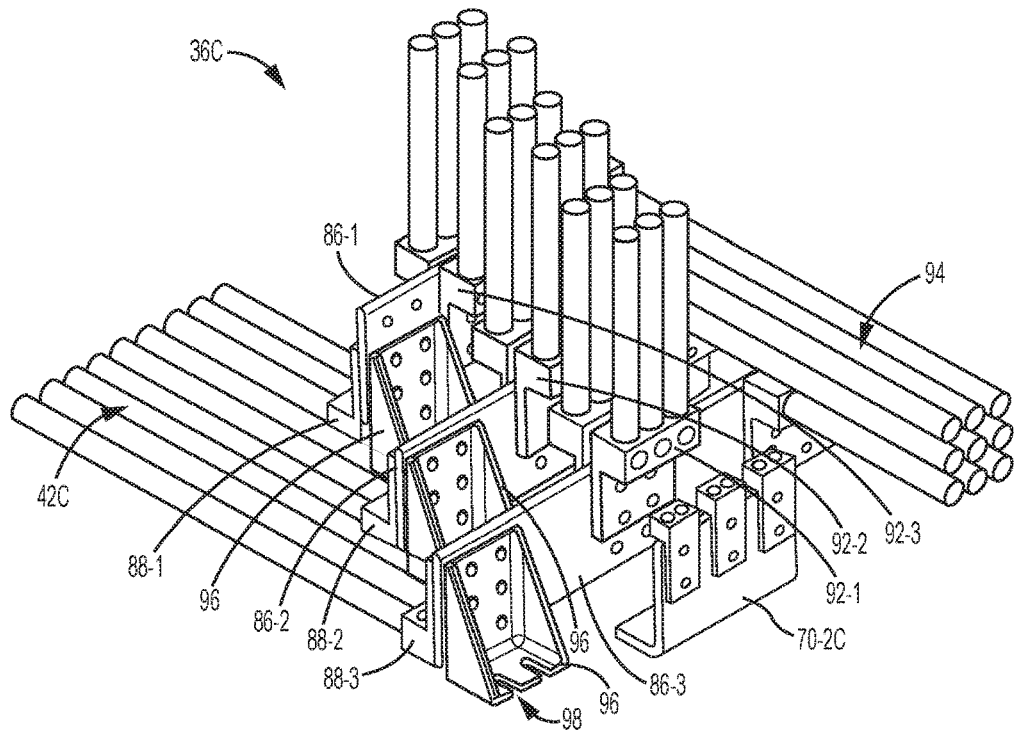
FIG. 5B is a back perspective view of the segmented branch interconnect system of FIG. 5A.
Figure 5C:
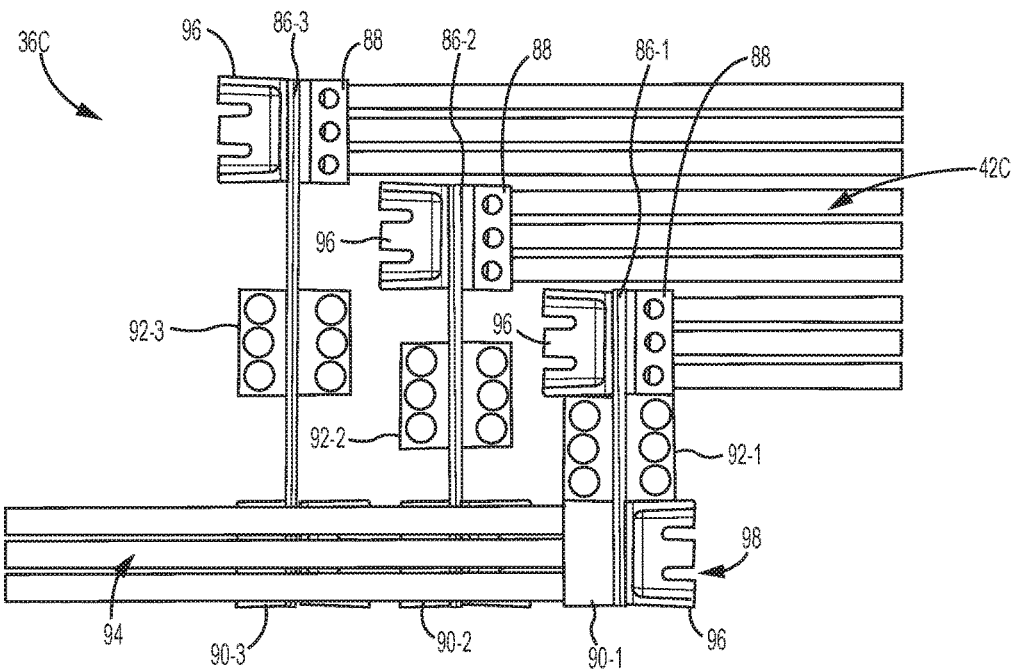
FIG. 5C is a top view of the segmented branch interconnect system of FIG. 5A.
Figure 5D:
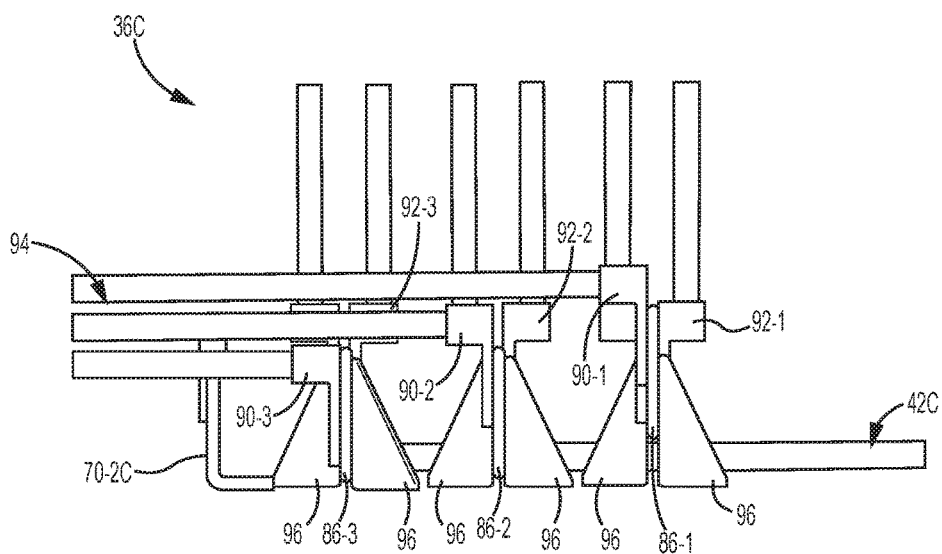
FIG. 5D is a side view of the segmented branch interconnect system of FIG. 5A.

FIG. 4 is a perspective view of another embodiment of the ESS of FIGS. 1 and 3A-3C with an endcap 84 for routing an underground cable into the ESS. In particular, as shown, the ESS 20C includes a first ESU 22-1C and a second ESU 22-2C. The first ESU 22-1C is configured such that the third interconnect port (not shown) is defined in the left wall 58-1C of the housing 24C. The endcap 84 covers the underground cabling connection (e.g., stub-up) as it enters the third interconnect port. Of course the endcap 84 could be configured to be any size and may be sized to correspond to the left wall 58-1C (or a portion thereof). Additionally, it is noted that the third interconnect port may be located in any wall of the housing 24C.

FIGS. 5A-5D are views of a first power interconnect system 36C. The first power interconnect system 36C is configured for a 480-volt three phase AC connection (requiring six lines per phase), although any other electrical connection could be used (e.g., single phase DC). It is noted that although the first power interconnect system 36C is discussed below, the same features apply to the second power interconnect system 38 (shown in FIGS. 3A-3C) as well.

Each first power interconnect system 36C includes a first bus bar 86-1 (referred to generally as bus bar 86), a second bus bar 86-2, and a third bus bar 86-3. The first bus bar 86-1 includes a first branch segment interconnect 88-1 (referred to generally as branch segment interconnect 88), a first jumper interconnect 90-1 (referred to generally as a jumper interconnect 90), and a first power main interconnect 92-1 (referred to generally as a power main interconnect 92). Similarly, the second bus bar 86-2 includes a second branch segment interconnect 88-2, a second jumper interconnect 90-2, and a second power main interconnect 92-2. Similarly, the third bus bar 86-3 includes a third branch segment interconnect 88-3, a third jumper interconnect 90-3, and a third power main interconnect 92-3. It is noted that each first power interconnect system 36C includes these connections, even if not all of these connections are utilized within the ESU. In this way, each ESU is interchangeable with each other ESU (i.e., any ESU and any first power interconnect system 36C within that ESU can be coupled to the electrical grid via underground cabling). The first power interconnect system 36C can further include a battery interconnect (not shown) to connect the first power interconnect system 36C to batteries and/or an inverter.

The branch segment interconnect 88 connects a first segmented branch interconnect system to a second branch interconnect system within an ESU 22 (shown in FIGS. 3A-3C). The jumper interconnect 90 connects a first segmented branch interconnect system of a first ESU (e.g., ESU 22-1B shown in FIGS. 3A-3C) to a second branch interconnect system of a second ESU (e.g., ESU 22-2B shown in FIGS. 3A-3C). The power main interconnect 92 connects the first power interconnect system 36C to underground cabling 48 (shown in FIG. 1) for establishing an electrical connection with an electrical grid 46 (shown in FIG. 1). Also shown is a first auxiliary power interconnect system 70-2C forming part of the auxiliary power transfer assembly 68 (shown in FIGS. 3A-3C).

Each of the interconnects 88-92 may make an electrical and mechanical connection using mechanical lugs. Further, each bus bar 86 varies in width to vary the horizontal placement of the branch segment interconnects 88. In other words, first, second, and third branch segment interconnects 88-1-88-3 are vertically aligned and horizontally offset from each other. This minimizes the height of the branch segment 42C (and respective cabling) so that the branch segment 42C can be placed underneath the batteries 28 (shown in FIGS. 3A-3C).

Each bus bar 86 varies the height of their respective jumper interconnect 90 such that the jumpers 94 (and respective cabling) are horizontally aligned but vertically offset. This condenses the cross-sectional area of the jumpers 94, and accordingly also minimizes the size of the respective port (e.g., port 76-1, port 78-1 shown in FIGS. 3A-3C). This facilitates manufacturability as in certain embodiments, the ports must meet certain specifications for sealing the interior volume 26 (shown in FIGS. 3A-3C) from the environment (e.g., water, dust, etc.) and withstanding certain environmental conditions (e.g., heat, seismic forces, etc.).

Each bus bar 86 includes one or more angled mounting brackets 96 at opposite ends of the bus bar 86 and/or at opposing surfaces of the bus bar 86 (although more or fewer angle mounting brackets 96 may be used). Each angled mounting bracket 96 includes slots 98 for mounting the segmented branch interconnect system 33 within the housing 24 (shown in FIGS. 3A-3C). The angled mounting brackets 96 and slots 98 facilitate assembly and mounting of the bus bars 86 within the interior volume 26 of the housing 24 (shown in FIGS. 3A-3C).

Among other advantages, the embodiments facilitate a scalable ESS that has standardized above ground connections, greatly reducing trenching and other labor costs, and allowing the ESS to be easily expanded as needed. Some embodiments also eliminate or reduce a need for in-the-field coupling of relatively large DC electrical equipment, and allow the use of aluminum conductors in the ESUs without the need for specialized in-the-field expertise associated with aluminum conductors.

Those skilled in the art will recognize improvements and modifications to the preferred embodiments of the disclosure. All such improvements and modifications are considered within the scope of the concepts disclosed herein and the claims that follow.

What is claimed is:

1. An energy storage unit comprising:
   a housing comprising a first end portion and a second end portion, the housing forming an interior volume configured to store a plurality of batteries that can collectively provide a maximum power level; and
   a segmented branch interconnect system comprising:
      a power transfer assembly comprising:
         a first power interconnect system positioned in proximity to the first end portion;
         a second power interconnect system positioned in proximity to the second end portion, the second power interconnect system configured to be coupled to a first adjacent power interconnect system of a first adjacent energy storage unit, the first power interconnect system and the second power interconnect system each configured for a three phase AC connection; and
         three or more conductors coupled to the first power interconnect system and the second power interconnect system, the three or more conductors being configured to transfer three phase electrical power between the first power interconnect system and the second power interconnect system;
         wherein the power transfer assembly is rated to transfer a power level that is at least three times the maximum power level provided by the plurality of batteries stored in the housing.

2. The energy storage unit of claim 1, wherein the first power interconnect system is positioned in the interior volume and the second power interconnect system is positioned in the interior volume.

3. The energy storage unit of claim 1, further comprising:
   a power converter configured to be coupled between the plurality of batteries and the power transfer assembly, and configured to:
      convert direct current provided by the plurality of batteries to alternating current for transfer of the alternating current by the power transfer assembly; and
      convert alternating current provided by the power transfer assembly to direct current for storage in the plurality of batteries.

4. The energy storage unit of claim 1, wherein the second power interconnect system is configured to be coupled to the first adjacent power interconnect system of the first adjacent energy storage unit above ground.

5. The energy storage unit of claim 1, wherein the first power interconnect system is configured to be coupled to a second adjacent power interconnect system of a second adjacent energy storage unit.

6. The energy storage unit of claim 1, wherein the first power interconnect system is configured to be coupled to an electrical grid.

7. The energy storage unit of claim 1, wherein the three or more conductors comprise aluminum.

8. The energy storage unit of claim 1, wherein the segmented branch interconnect system further comprises:
   an auxiliary power assembly comprising:
      a first auxiliary power interconnect system positioned in proximity to the first end portion;
      a second auxiliary power interconnect system positioned in proximity to the second end portion, the second auxiliary power interconnect system configured to be coupled to a first adjacent auxiliary power interconnect system of the first adjacent energy storage unit; and
      an auxiliary power line coupled to the first auxiliary power interconnect system and the second auxiliary power interconnect system, the auxiliary power line being configured to transfer auxiliary power between the first auxiliary power interconnect system and the second auxiliary power interconnect system;
      wherein the auxiliary power line is rated to transfer a power level that is at least three times a maximum auxiliary power level utilized by the energy storage unit.

9. The energy storage unit of claim 1, wherein the plurality of batteries can collectively generate a maximum of 450 A.

10. The energy storage unit of claim 1, wherein the power transfer assembly is rated to transfer a power level of 2000 A at 480 VAC.

11. The energy storage unit of claim 1, further comprising an air conditioning unit configured to cool the three or more conductors coupled to the first power interconnect system and the second power interconnect system.

12. An energy storage system comprising:
   a plurality of energy storage units, each of the energy storage units comprising:
      a housing comprising a first end portion and a second end portion, the housing forming an interior volume configured to store a plurality of batteries that can collectively provide a maximum power level;
      a segmented branch interconnect system comprising:
         a power transfer assembly comprising:
            a first power interconnect system positioned in proximity to the first end portion;
            a second power interconnect system positioned in proximity to the second end portion, the first power interconnect system and the second power interconnect system each configured for a three phase AC connection; and
            three or more conductors coupled to the first power interconnect system and the second power interconnect system, the three or more conductors being configured to transfer three phase electrical power between the first power interconnect system and the second power interconnect system;
            wherein the power transfer assembly is rated to transfer a power level that is at least three times the maximum power level provided by the plurality of batteries stored in the housing; and
      a first energy storage unit of the plurality of energy storage units being configured to be coupled to an electrical grid;
   wherein each power transfer assembly of each of the energy storage units is configured to be coupled to a power transfer assembly of another energy storage unit such that each power transfer assembly in the plurality of energy storage units are coupled together.

13. The energy storage system of claim 12, wherein each of the energy storage units further comprises:
   a power converter configured to be coupled between the plurality of batteries and the power transfer assembly, and configured to:
      convert direct current provided by the plurality of batteries to alternating current for transfer of the alternating current by the power transfer assembly; and
      convert alternating current provided by the power transfer assembly to direct current for storage in the plurality of batteries.

14. The energy storage system of claim 12, wherein each of the energy storage units is configured to be coupled to at least one other of the energy storage units above ground.

15. The energy storage system of claim 12, wherein the three or more conductors in each power transfer assembly comprise aluminum.

16. An energy storage unit comprising:
   a housing that forms an interior volume configured to store a plurality of batteries that can collectively provide a maximum power level; and
   a segmented branch interconnect system comprising:
      a power transfer assembly comprising:
         a power interconnect system configured to be coupled to an adjacent power interconnect system of an adjacent energy storage unit, the power interconnect system configured for a three phase AC connection; and
         three or more conductors configured to transfer three phase electrical power and to be coupled to the plurality of batteries and the adjacent power interconnect system of the adjacent energy storage unit;
         wherein the power transfer assembly is rated to transfer a power level that is at least three times the maximum power level provided by the plurality of batteries stored in the housing.

17. The energy storage unit of claim 16, wherein the power interconnect system is positioned in the interior volume.

18. The energy storage unit of claim 16, further comprising:
   a power converter configured to be coupled between the plurality of batteries and the power transfer assembly, and configured to:
      convert direct current provided by the plurality of batteries to alternating current for transfer of the alternating current by the power transfer assembly; and
      convert alternating current provided by the power transfer assembly to direct current for storage in the plurality of batteries.

19. The energy storage unit of claim 16, wherein the power interconnect system is configured to be coupled to the adjacent power interconnect system of the adjacent energy storage unit above ground.

20. The energy storage unit of claim 16, wherein the power interconnect system is configured to be coupled to a second adjacent power interconnect system of a second adjacent energy storage unit.

21. The energy storage unit of claim 16, wherein the power interconnect system is configured to be coupled to an electrical grid.

22. The energy storage unit of claim 16, wherein the three or more conductors comprise aluminum.

23. The energy storage unit of claim 16, wherein the segmented branch interconnect system further comprises:
   an auxiliary power assembly comprising:
      an auxiliary power interconnect system; and
      an auxiliary power line coupled to the auxiliary power interconnect system, the auxiliary power line being configured to transfer auxiliary power;
         wherein the auxiliary power line is rated to transfer a power level that is at least three times a maximum auxiliary power level utilized by the energy storage unit.

* * * * *